W. CHRISTIE.
TRANSMISSION GEARING.
APPLICATION FILED FEB. 25, 1920.

1,336,132.

Patented Apr. 6, 1920.

Inventor
WALTER CHRISTIE
By his Attorney
E. W. Marshall

W. CHRISTIE.
TRANSMISSION GEARING.
APPLICATION FILED FEB. 25, 1920.

1,336,132.

Patented Apr. 6, 1920.
5 SHEETS—SHEET 2.

Inventor
WALTER CHRISTIE
By his Attorney
E. W. Marshall

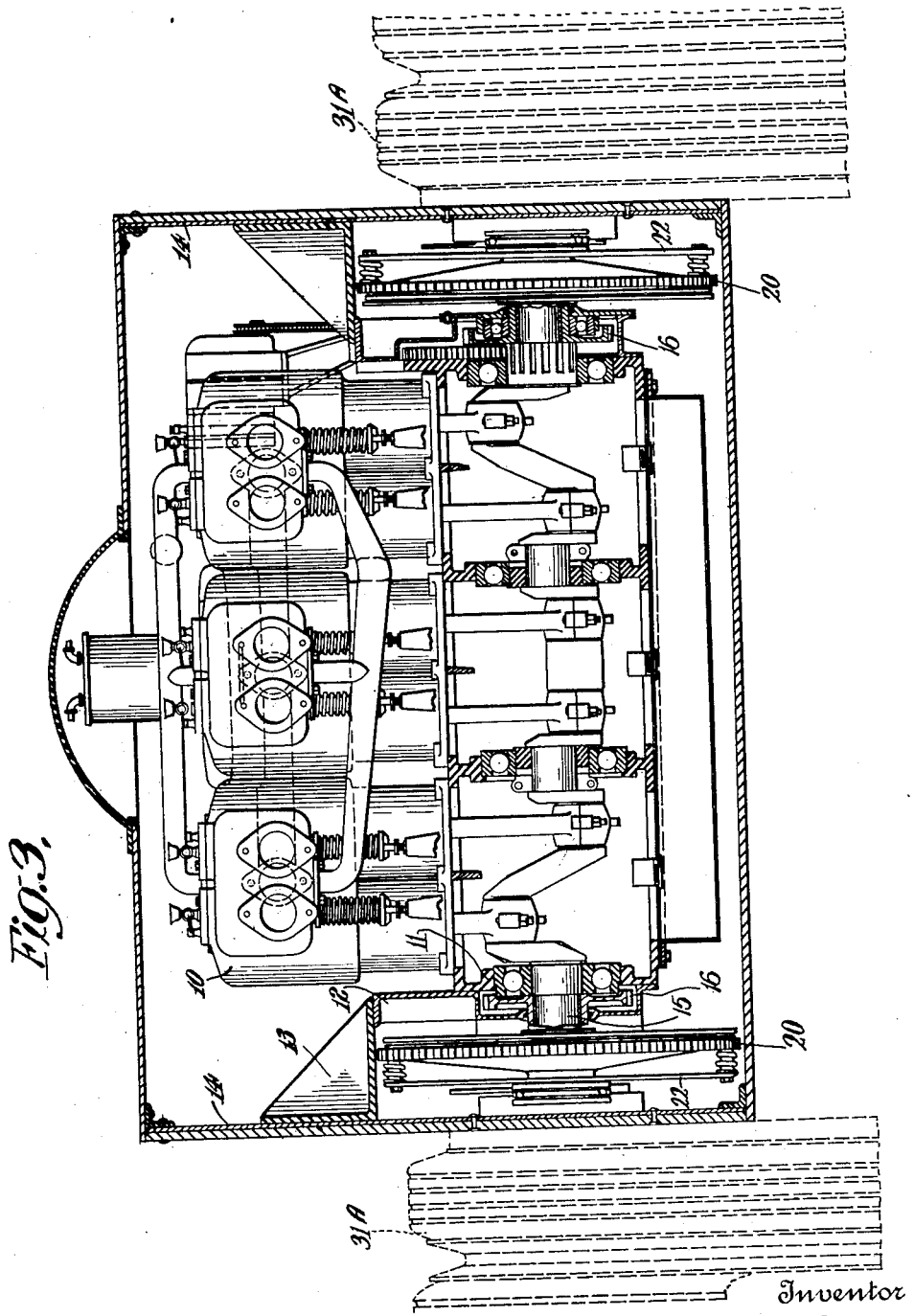

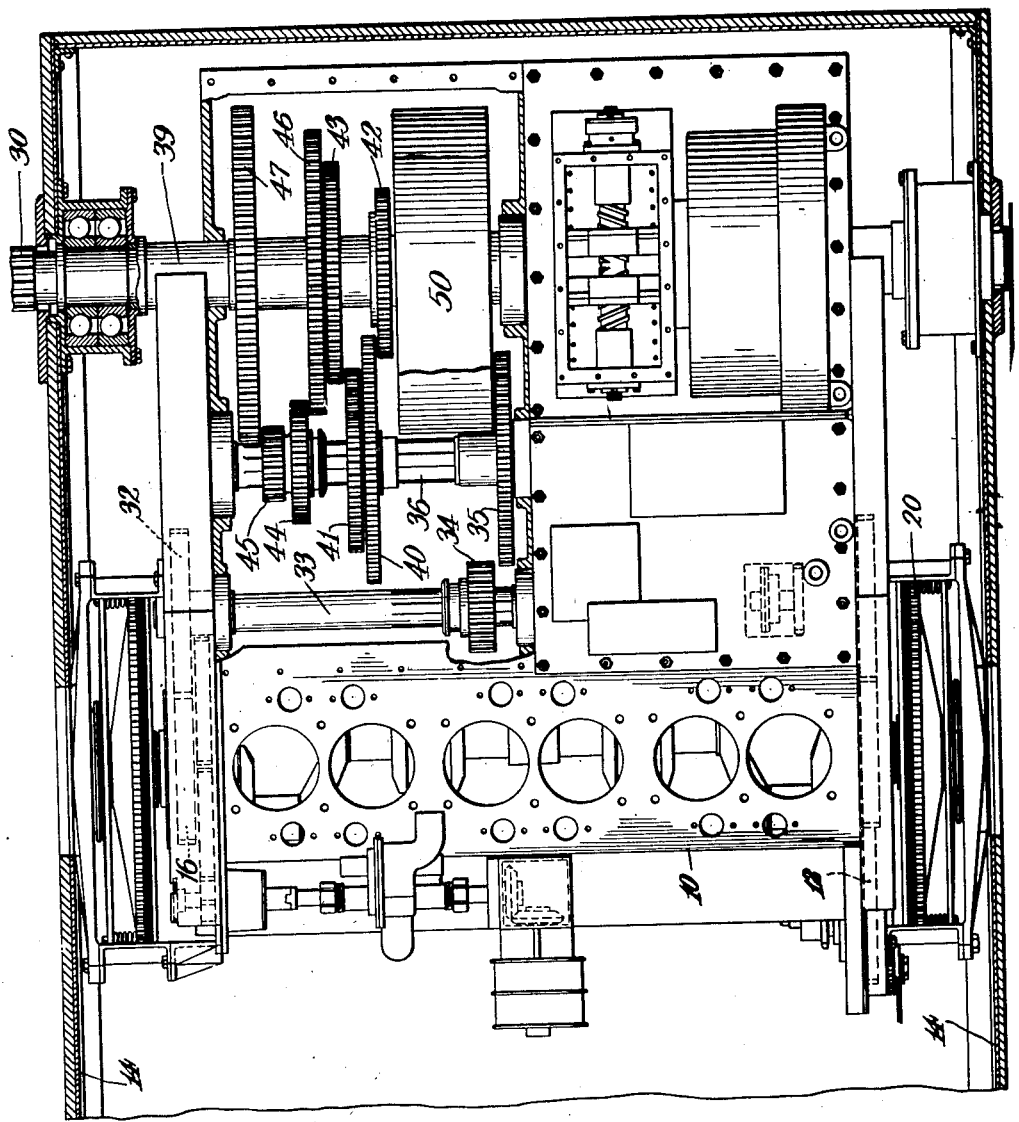

W. CHRISTIE.
TRANSMISSION GEARING.
APPLICATION FILED FEB. 25, 1920.

1,336,132.

Patented Apr. 6, 1920.

Inventor
WALTER CHRISTIE
By his Attorney
E. W. Marshall

UNITED STATES PATENT OFFICE.

WALTER CHRISTIE, OF WEEHAWKEN, NEW JERSEY.

TRANSMISSION-GEARING.

1,336,132.    Specification of Letters Patent.    Patented Apr. 6, 1920.

Application filed February 25, 1920. Serial No. 361,201.

*To all whom it may concern:*

Be it known that I, WALTER CHRISTIE, a citizen of the United States of America, and a resident of Weehawken, county of Hudson, and State of New Jersey, have invented certain new and useful Improvements in Transmission-Gearing, of which the following is a full, clear, and exact description.

My invention relates to transmission gearing for motor driven vehicles especially those of the chain tractor or creeper type, and its object is to improve the gearing between the motor and the vehicle wheel and the arrangements for controlling the same. More specifically, its object is to provide an independently controlled selective transmission gearing for each side of a tractor.

These and other objects of the invention will appear in the following specification in which I will describe the invention, the novel features of which will be set forth in appended claims.

Referring to the drawings:

Fig. 3 is an end view partly in section of this transmission gearing with the driven wheels of the tractor shown by broken lines.

Fig. 4 is a plan view partly in section of the mechanism shown in the preceeding figures of the drawings.

Like characters of reference designate corresponding parts in all of the figures of the drawings.

Figure 1:
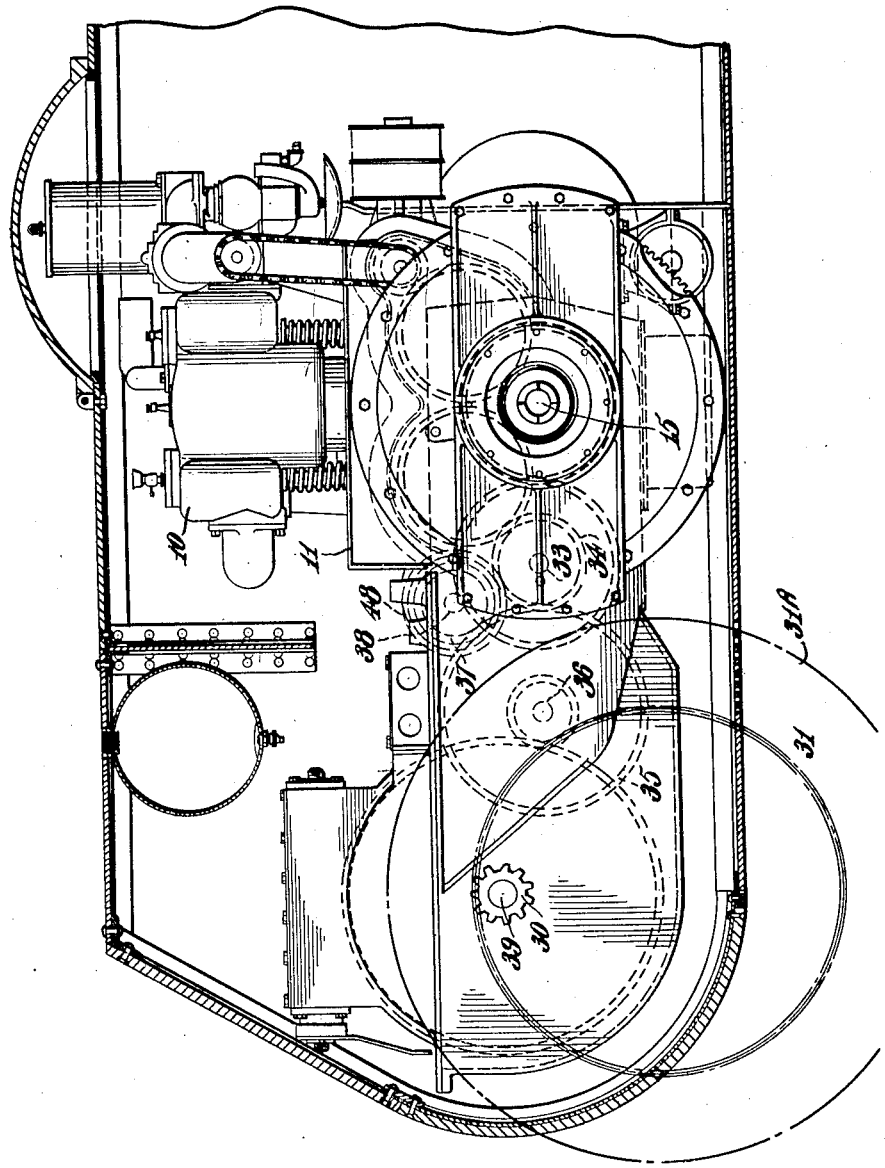
Figure 1 is a side elevation partly in section, of a transmission gearing which is made according to and embodies the present invention, the view being taken from the timing gear side thereof.
Figure 2:
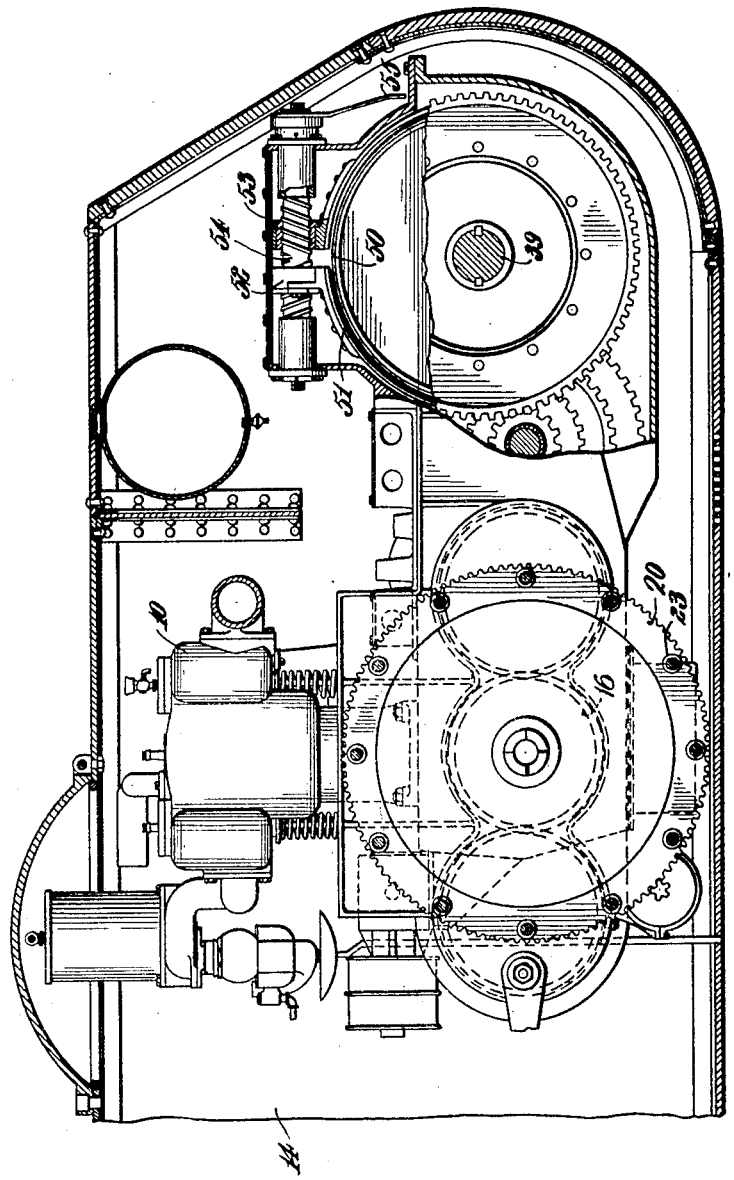
Fig. 2 is a similar view of the opposite side of the same mechanism.
Figure 6:
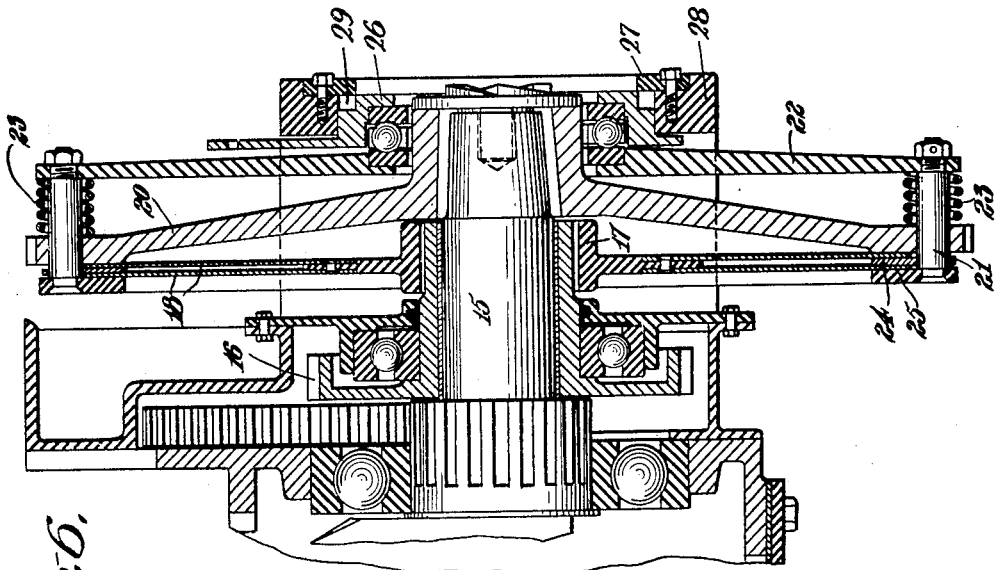
Figs. 5 and 6 are sectional end elevations of the two clutch mechanisms which form parts of this apparatus.
Figure 5:
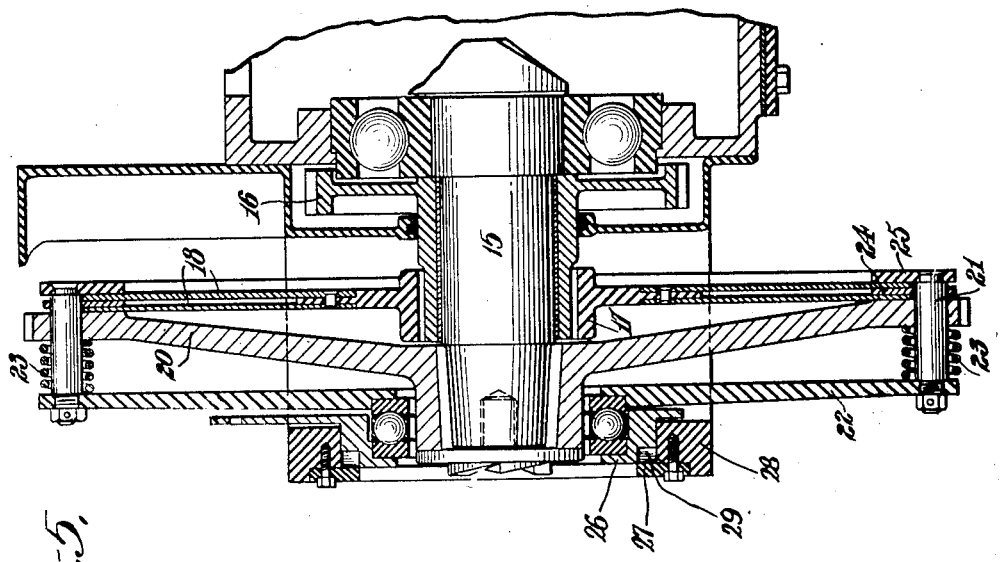

10 designates an engine set transversely across the tractor. 11 is its crank case which is suspended by members 12 from angle brackets 13 affixed to parallel side plates 14 which form parts of the frame or chassis of the tractor. 15 is the engine shaft. Rotatively supported on opposite ends thereof are driving gears 16. To the hubs of the driving gears are keyed clutch hubs 17 each of which has an annular flange to which are riveted clutch plates 18.

Keyed to the ends of the engine shaft are fly wheels 20 each of which has a surface arranged to engage the outer surface of its adjacent clutch plate. Studs 21 extend from outer pressure plates 22 through the fly wheels and through intermediate friction plates 24 between the clutch plates, and into inner pressure plates 25 to which they are riveted. Springs 23 interposed between the outer pressure plates and the fly wheels, surround studs 21 and tend to force the parts of the clutch together into driving engagement to cause the gears 16 to rotate with the engine shaft 15.

The pressure of springs 23 is manually released to disconnect the driving gears from the engine shaft by rotating a disk 26 which has beveled cam faces which bear against similar but oppositely beveled cam surfaces on a stationary plate 27 fixedly held by a bracket 28. The cam surfaces are at 29.

Each driving gear 16 is arranged to drive a pinion 30 through gearing which I will now describe. These pinions are on opposite sides of the tractor and in mesh with bull gears 31 affixed to wheels 31$^A$. The gearing is of the selective sliding type. Two complete and independently controlled sets of gears are provided, but as they are alike, it is only necessary to describe one of them. This is shown best in Figs. 1 and 4. Gear 16 is in mesh with a gear 32 fixed to an arbor 33 on which is slidably splined a gear 34 which is shown in a neutral position in Fig. 4. This may be slid into engagement with a gear 35 fixed to an arbor 36 (Fig. 4) or into engagement with a gear 37 on a shaft 38 (Fig. 1). 39 is the pinion shaft.

On shaft 36 is a pair of gears 40, 41 arranged to engage respectively with gears 42, 43 on the pinion shaft to drive it at different rates of speed. Gears 44, 45 on shaft 36 are arranged to engage respectively with gears 46, 47 on the pinion shaft 39, for two more speed reductions. Therefore there are four gear ratios shown in Fig. 4 between the driving gear 16 and the pinion 30.

The reverse gear 37 drives a gear 48 which is in mesh with the gear 35 to drive shaft 36 in the opposite direction. The four change gears between shafts 33 and 39 are still available so that four speeds in both directions are provided for.

50 is a brake drum on pinion shaft 39. 51 is the brake band on opposite ends of which are right and left hand internally threaded nuts 52 and 53 through which passes a right and left hand threaded screw 54 manually rotated by suitable connections with a lever 55.

The carbureter, magneto and other engine accessories which are shown on the drawings are not specifically described as they are of well known construction and form no part of the present invention.

This form of transmission gearing is designed for use with the types of tractors which are shown in my co-pending applications for patents, Serial Nos. 259,310 and 315,777, filed respectively October 23, 1918, and August 6, 1919, and another application signed of even date herewith. In order to handle chain tractors more effectively than has been possible heretofore, I have provided separate and independently controlled transmission gearing between the engine and each side of the tractor and have provided four gear ratios or speed reductions for both directions of travel. The result is that the apparatus may be driven with equal facility in either direction. Another beneficial result is that the rate at which one side of the tractor is driven may be varied relatively to the other side. One side may be driven in one direction at any desired rate and the other side may be driven in the opposite direction at the same or another rate of speed.

The invention upon which this application is based is broader in scope than the particular embodiment thereof which has been shown and described, and I intend no limitations other than those imposed by the appended claims.

What I claim is:

1. For a tractor, an engine, driving gears mounted adjacent to opposite ends of the crank shaft thereof, independent clutch members operable selectively to engage the respective gears with the opposite ends of the crank shaft, respectively, selective type change-speed transmissions connected operatively to said gears and controllable by said clutch members, respectively, and oppositely disposed tractor wheeels connected operatively to said transmissions, respectively.

2. For a tractor, an engine, driving gears mounted loosely on the opposite ends of the crank shaft, independent clutch members operable selectively to engage the respective gears with the opposite ends of the crank shaft, respectively, selective type change-speed transmissions connected operatively to said gears and controllable by said clutch members, respectively, and oppositely disposed tractor wheels connected operatively to said transmissions, respectively.

3. For a tractor, an engine mounted transverse of the frame thereof, driving gears mounted loosely on the opposite ends of the crank shaft of the engine, independent clutch members mounted on the crank shaft and operable selectively to engage the respective gears with the crank shaft, selective type change-speed transmissions connected operatively to said gears and controllable by said clutch members, respectively, and oppositely disposed tractor wheels connected operatively to said transmissions, respectively.

In witness whereof, I hereunto set my hand this 24 day of February, 1920.

WALTER CHRISTIE.

Witness:
  HELEN LINDSAY.